(12) United States Patent
Ge et al.

(10) Patent No.: US 11,946,364 B2
(45) Date of Patent: Apr. 2, 2024

(54) REMOVING GUIDED WAVE NOISE FROM RECORDED ACOUSTIC SIGNALS

(71) Applicant: Halliburton Energy Services, Inc., Houston, TX (US)

(72) Inventors: Yao Ge, Singapore (SG); Ruijia Wang, Singapore (SG); Philip William Tracadas, Houston, TX (US); Yi Yang Ang, Singapore (SG); Xiang Wu, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 898 days.

(21) Appl. No.: 16/922,513

(22) Filed: Jul. 7, 2020

(65) Prior Publication Data

US 2021/0108510 A1  Apr. 15, 2021

Related U.S. Application Data

(60) Provisional application No. 62/913,626, filed on Oct. 10, 2019.

(51) Int. Cl.
*E21B 47/107* (2012.01)
*G01N 29/38* (2006.01)
(Continued)

(52) U.S. Cl.
CPC .......... *E21B 47/107* (2020.05); *G01N 29/38* (2013.01); *G01N 29/40* (2013.01); *G01N 29/42* (2013.01); *G01V 1/50* (2013.01)

(58) Field of Classification Search
None
See application file for complete search history.

(56) References Cited

U.S. PATENT DOCUMENTS 8,553,497 B2  10/2013  Krohn
9,982,527 B2   5/2018  Zhao et al.
(Continued)

FOREIGN PATENT DOCUMENTS

WO  2018013049       1/2018
WO  2018080450 A1   5/2020

OTHER PUBLICATIONS

International Search Report for Application PCT/US2020/041995 dated Dec. 10, 2020.
(Continued)

*Primary Examiner* — Raul J Rios Russo
*Assistant Examiner* — Carl F. R. Tchatchouang
(74) *Attorney, Agent, or Firm* — John Wustenberg; C. Tumey Law Group PLLC

(57) ABSTRACT

A method for removing a guided wave noise in a time-domain may include recording one or more acoustic signals with one or more receivers at a first location, wherein the one or more acoustic signals are raw data. The method may further include determining a slowness range, estimating a downward guided wave noise by stacking the one or more acoustic signals based at least in part on a positive slowness, estimating an upward guided wave noise by stacking the one or more acoustic signals based at least in part on a negative slowness, and identifying a dominant direction of propagation. The method may further include identifying a slowness from a highest stacked amplitude for the dominant direction of propagation, estimating a downward guided wave noise with the slowness, estimating an upward guided wave noise with the slowness, and subtracting the downward guided wave noise and the upward guided wave noise.

20 Claims, 12 Drawing Sheets

(51) Int. Cl.
*G01N 29/40* (2006.01)
*G01N 29/42* (2006.01)
*G01V 1/50* (2006.01)

(56) References Cited

U.S. PATENT DOCUMENTS

| | | |
|---|---|---|
| 2016/0018549 A1 | 1/2016 | Tracadas |
| 2016/0109605 A1 | 4/2016 | Bose et al. |
| 2016/0363681 A1* | 12/2016 | Boiero .................. G01V 1/282 |
| 2017/0176622 A1 | 6/2017 | Lemarenko et al. |
| 2017/0212274 A1 | 7/2017 | Sun et al. |
| 2017/0269243 A1 | 9/2017 | Jagannathan et al. |
| 2017/0321540 A1 | 11/2017 | Lu et al. |
| 2017/0371058 A1 | 12/2017 | Li et al. |
| 2018/0112523 A1 | 4/2018 | Yang et al. |
| 2018/0153205 A1 | 6/2018 | Wu |
| 2018/0164463 A1 | 6/2018 | Hornby et al. |
| 2018/0217021 A1 | 8/2018 | Lu et al. |
| 2018/0283167 A1 | 10/2018 | Ang et al. |
| 2019/0018161 A1 | 1/2019 | Wang et al. |
| 2019/0018162 A1 | 1/2019 | Wang et al. |
| 2019/0025451 A1 | 1/2019 | Wang et al. |
| 2019/0025452 A1 | 1/2019 | Wang et al. |
| 2019/0145241 A1 | 5/2019 | Yao et al. |
| 2019/0204468 A1 | 7/2019 | Ge et al. |
| 2019/0257971 A1 | 8/2019 | Wang et al. |
| 2019/0293823 A1 | 9/2019 | Sun et al. |
| 2019/0317238 A1 | 10/2019 | Wang et al. |
| 2020/0003924 A1 | 1/2020 | Jin et al. |
| 2020/0072036 A1 | 3/2020 | Wang et al. |
| 2020/0116883 A1 | 4/2020 | Padhi et al. |
| 2020/0116884 A1 | 4/2020 | Weng et al. |

OTHER PUBLICATIONS

Written Opinion of the International Search Authority for Application PCT/US2020/041995 dated Dec. 10, 2020.
International Search Report and Written Opinion for Application No. PCT/US2020/041995, dated Oct. 30, 2020.
Well Assurance, Acoustic Conformance Xaminer® (ACX™) Service, Halliburton, H011959, Aug. 2016.
Aditama, P., Mirza, M., Al Saadi, H., Al Wardi, A., Aprilianto, E. C., Broughton, D., & Troup, D. (2012). Evaluation of a Passive Ultrasonic Log Application for Casing Integrity Assessment: A Case Study in a South Oman Field. SPE Asia Pacific Oil and Gas Conference and Exhibition.
Julian, J. Y., Duerr, A. D., Jackson, J. C., & Johns, J. E. (2013). Identifying Small Leaks with Ultrasonic Leak Detection-Lessons Learned in Alaska. SPE Annual Technical Conference and Exhibition.
Julian, J. Y., King, G. E., Johns, J. E., Sack, J., & Robertson, D. B. (2007). Detecting Ultrasmall Leaks with Ultrasonic Leak Detection, Case Histories from the North Slope, Alaska. International Oil Conference and Exhibition in Mexico.
Yang, Q., Zhao, J., & Rourke, M. (2019). Downhole Leak Detection: Introducing a New Wireline Array Noise Tool. SPE/ICoTA Well Intervention Conference and Exhibition.
GoWell—Array Noise Tool, Aug. 2017.
https://www.elsevier.com/books/quantitative-borehole-acoustic-methods/tang/978-0-08-044051-4.

* cited by examiner

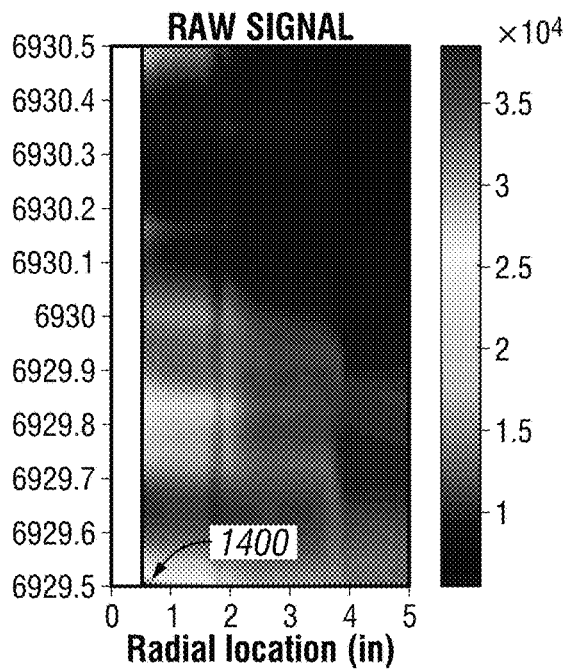
FIG. 14A
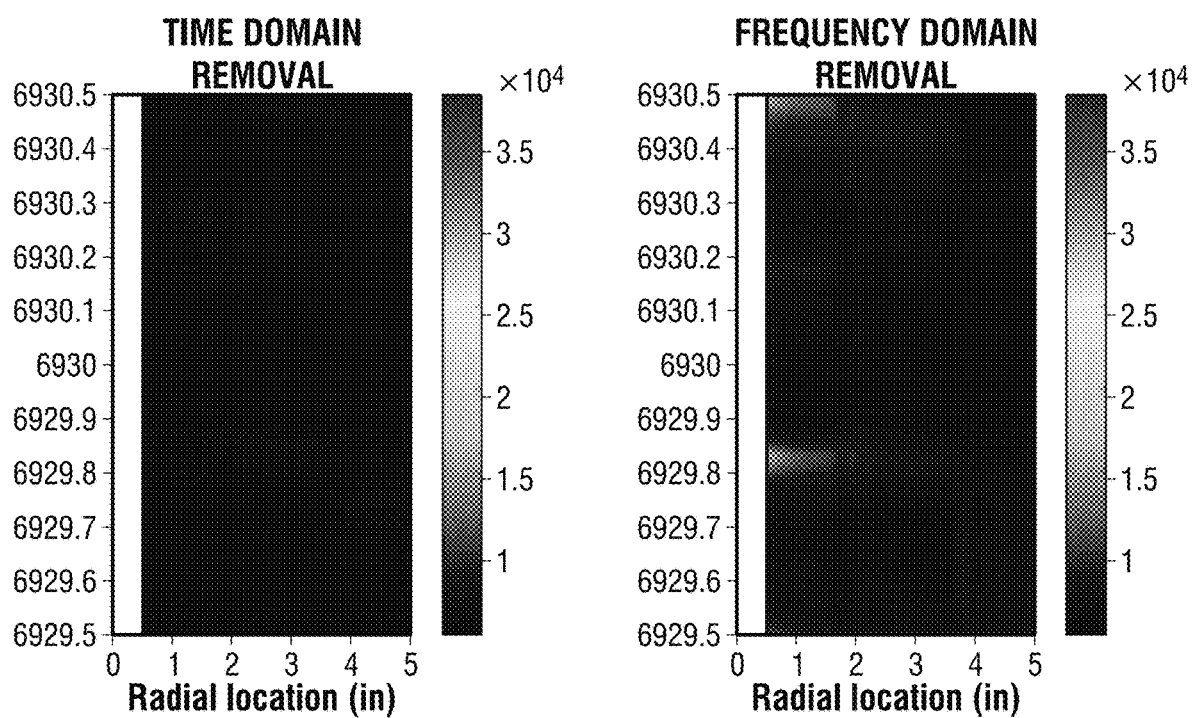
FIG. 14B   FIG. 14C

REMOVING GUIDED WAVE NOISE FROM RECORDED ACOUSTIC SIGNALS

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

A growing concern in the life of an oil or gas well is the pressure buildup in its annuli. The first challenge for a petroleum engineer is to identify the source of the leak to enable design of an effective remedial activity. Identification of the source of pressure communication between well tubing-casing and casing-casing annuli presents an enormous challenge to petroleum engineers. There are many methods to identify the source of leaks in a well. Current methods require logging instruments to stop and "listen" for leaks as noise and vibration from the logging instrument may cover the noise produced by the leaks. This may increase logging time, making current methods and systems slow and computationally intensive. The longer it takes to identify a leak, the longer a leak has time to expand, which may further increase and complicate remedial activity.

BRIEF DESCRIPTION OF THE DRAWINGS

These drawings illustrate certain aspects of some examples of the present disclosure and should not be used to limit or define the disclosure.

FIG. 14A is a beamforming map of a raw signal recorded by the receiver array;

FIG. 14B is a beamforming map of the removal of the guided wave noise in the time domain;

FIG. 14C is a beamforming map of the removal of the guided wave noise in the frequency domain;

DETAILED DESCRIPTION

This disclosure may generally relate to methods for removal of guided-wave noise from raw signal recorded by a receiver array for dynamic leak detection logging. Specifically, removing guided-wave noise from raw signals during a continuous logging operation in which the logging tool does not stop and "listen" for leaks. For example, an acoustic log created by array sonic sensors may be used to identify leaks that have a slow leak rate, as an array of sonic sensors are sensitive to slow leaks. Additionally, dynamic logging may help in reducing time by providing a continuous mode to quickly identify areas with possible leaks in the wellbore. The methods may improve detection of leaks inside a pipe string and/or casing. In examples, a guided wave noise caused by equipment contacting the borehole sometimes may be significant and cover an acoustic signal created by a leak. The proposed methods and system may enable continuous and high resolution logging data without stopping to record leak signals even with additional noise being recorded.

Figure 1:
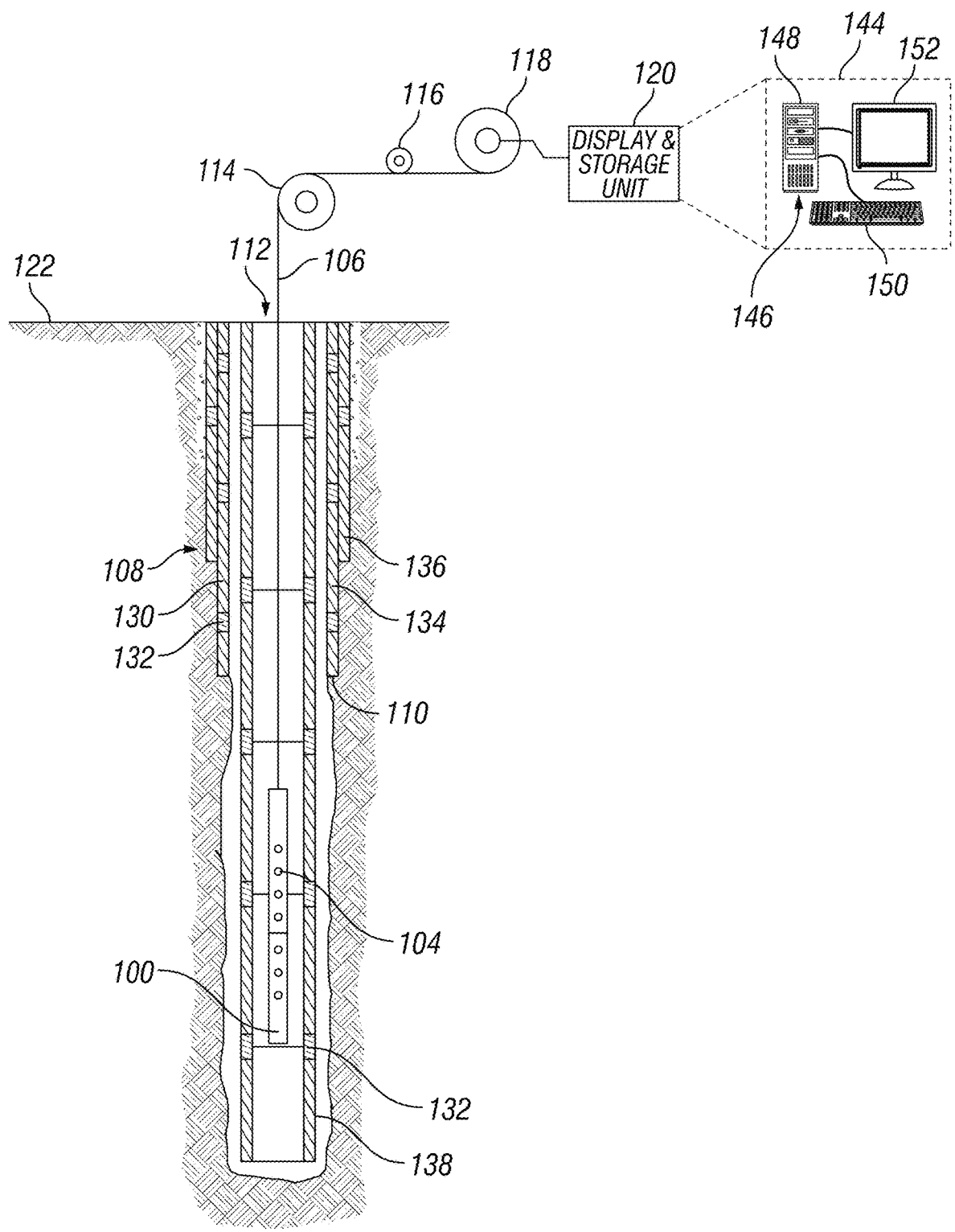
FIG. 1 illustrates a system including an acoustic logging tool.

FIG. 1 illustrates an operating environment for an acoustic logging tool 100 as disclosed herein in accordance with particular embodiments. Acoustic logging tool 100 may comprise a receiver 104. In examples, there may be any number of receivers 104, which may be disponed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Figure 2:
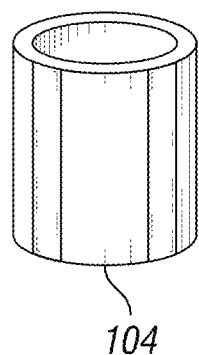
FIG. 2 illustrates an example of a receiver.

As illustrated, one or more receivers 104 may be positioned on the acoustic logging tool 100. It should be understood that the configuration of acoustic logging tool 100 shown on FIG. 1 is merely illustrative and other configurations of acoustic logging tool 100 may be used with the present techniques. Receiver 104 may include any suitable acoustic receiver suitable for use downhole, including piezoelectric elements that may convert acoustic waves into an electric signal or hydrophones. Additionally, receiver 104 may be able to record any waves g generated by leakage or other flow event inside and/or outside of the borehole. FIG. 2 illustrates examples of receiver 104. Receivers 104 may include a segmented piezoelectric tube, individual receiver, azimuthal receivers, or hydrophones. In examples, receiver 104 may be disposed at any suitable location on acoustic logging tool 100. For example, receivers 104 may be disposed along the outer edge of acoustic logging tool 100 or within acoustic logging tool 100. Additionally, receivers 104 may be stacked along the longitudinal axis of acoustic logging tool 100 and/or one or more receivers 104 may be disposed circumferentially in a plane perpendicular to the longitudinal axis of acoustic logging tool 100.

Referring back to FIG. 1, the recordation of signals by receivers 104 may be controlled by display and storage unit 120, which may include an information handling system 144. As illustrated, the information handling system 144 may be a component of the display and storage unit 120. Alternatively, the information handling system 144 may be a component of acoustic logging tool 100. An information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

Figure 3:
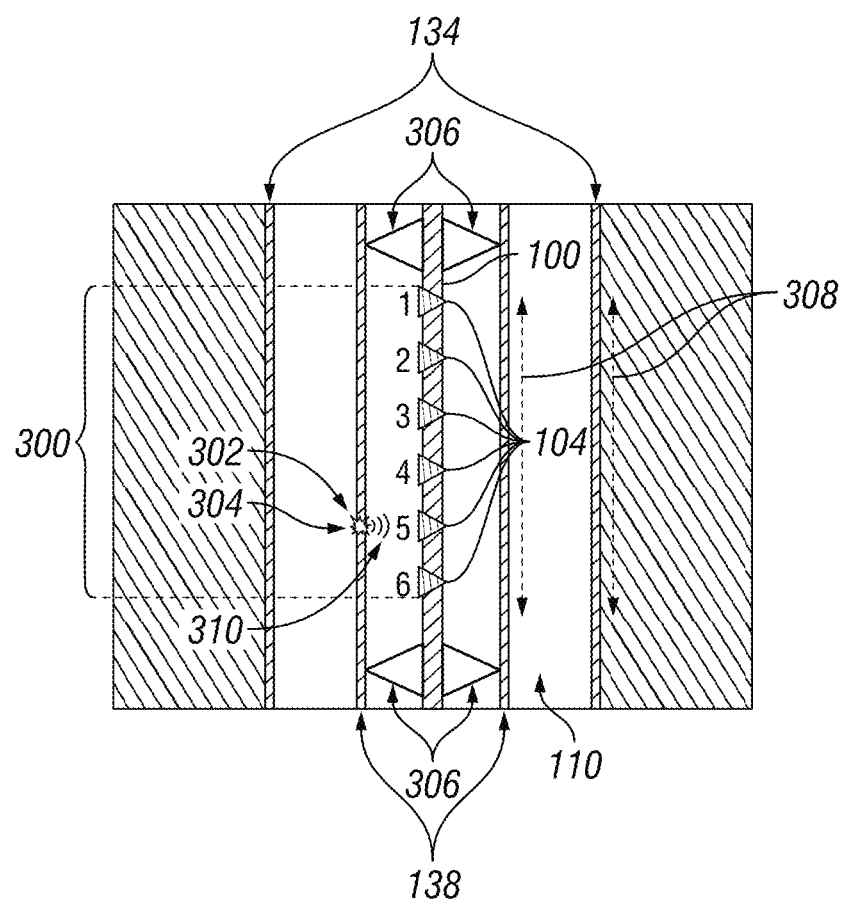
FIG. 3 illustrates an acoustic logging tool during measurement operations.

FIG. 3 illustrates acoustic logging tool 100 with a receiver array 300 in accordance with particular embodiments. Without limitation, there may be any number of receivers 104. As illustrated, the receiver array 300 includes a plurality of the receivers 104 arranged longitudinally along the acoustic logging tool 100. During measurement operations acoustic logging tool 100 may detect the depth and radial location of leak 302 and/or flow of fluid 304 in wellbore 110. In examples, acoustic logging tool 100 may be deployed with one or more stabilizers 306 installed above or below acoustic logging tool 100. As illustrated in FIG. 3, and discussed above, acoustic logging tool 100 may be disposed in pipe string 138, which may be disposed in a first casing 134. During operations, each receiver 104 of receiver array 300 may sense and record any number of acoustic signals and/or vibrations continuously as acoustic logging tool 100 moves up or down wellbore 110 within pipe string 138. The recorded acoustic signals and/or vibrations may be identified as acoustic data. The acoustic data may be transmitted to information handling system 144, which may process each recorded acoustic signal with a beamforming algorithm to identify the location of the acoustic source. In examples, the acoustic source may be a leak 302 caused by flow of fluid 304 in leak 302. Fluid 304 may be flowing from outside pipe string 138 and into pipe string 138, or vice versa. Likewise, fluid 304 may be moving from outside of first casing 134 and into first casing 134, or vice versa. This is true for any casing that may be outside of first casing 134. To properly process acoustic noise beamforming may be used. Beamforming is a signal processing technique used in receiver array 300 for directional signal transmission or reception. This is achieved by combining waveforms by a phased array in such a way that signals at particular angles experience constructive interference while others experience destructive interference.

For example, during logging operations, acoustic signals recorded by one or more receivers 104 may include guided-wave noise 308. Guided wave noise 308 is defined as borehole acoustic waves propagating along pipe string 138 or first casing 134. In examples, guided-wave noise 308 may propagate up or down any casing. Guided wave noise 308 may be induced by the logging operation, discussed below, by stabilizer 306 or from naturally occurring phenomenon. Additionally, guided wave noise 308 may combined with acoustic an acoustic signal generated from the flow of fluid 304 through a leak 302. Described below are methods that remove guided wave noise 308 from measurements to determine the acoustic signal generated from leak 302. This may allow for locating leak 302 within wellbore 110. Guided wave noise 308 may propagate for any distance up and/or down pipe string 138 and/or first casing 134 and contaminate a direct arriving leak signal 310, which may be used for downhole leakage localization. When the noise amplitude from guided wave noise 308 is greater than an amplitude of leak signal 310, the beamforming algorithm result may show a false positive for a leak 302 at a measurement location. Additionally, a higher amplitude from guided wave noise 308 may drown out the amplitude of leak signal 310 from leak 302, which may make leak signal 310 hard to identify.

In examples, guided-wave noise 308 may be generated from equipment disposed or connected to acoustic logging tool 100 that may come into contact with pipe string 138 and/or first casing 134, which may emit a noise that may be referred to as road noise. For example, stabilizers 306 may operate and function to center acoustic logging tool 100 within pipe string 138. Stabilizers 306 perform this function by exerting a force on the inside surface of pipe string 138. This force may cause stabilizers 306 to strike the inside of surface of pipe string 138 in a manner that creates noise. The vibration of this noise may travel up and down pipe string 138 as guided wave noise 308. As disclosed below, methods to remove guided-wave noise 308 in the time domain and the frequency domain are described.

Figure 4A:
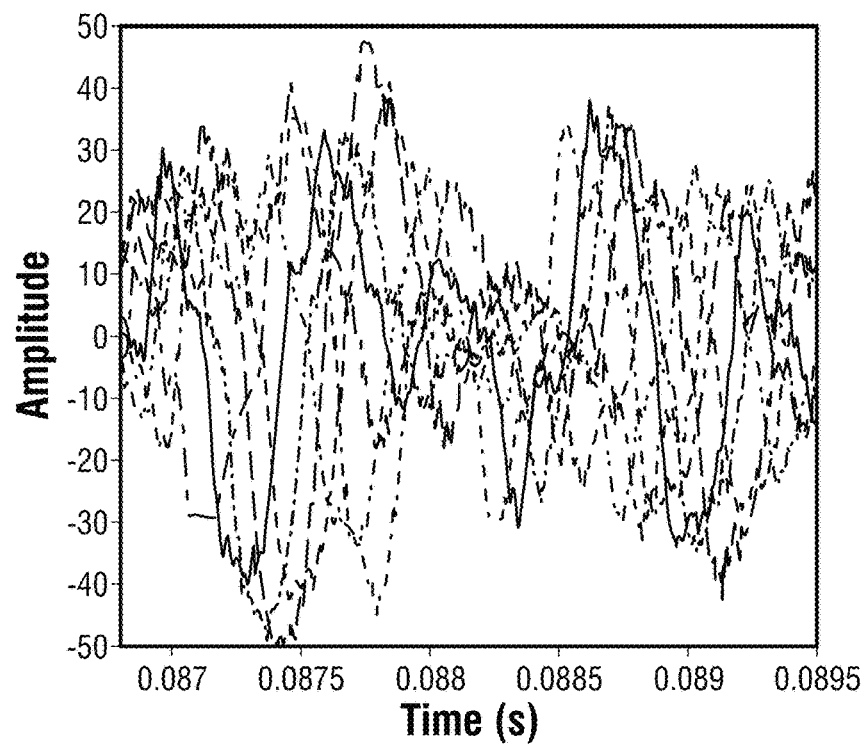
FIG. 4A is a graph of a raw signal recorded by a receiver array.
Figure 4B:
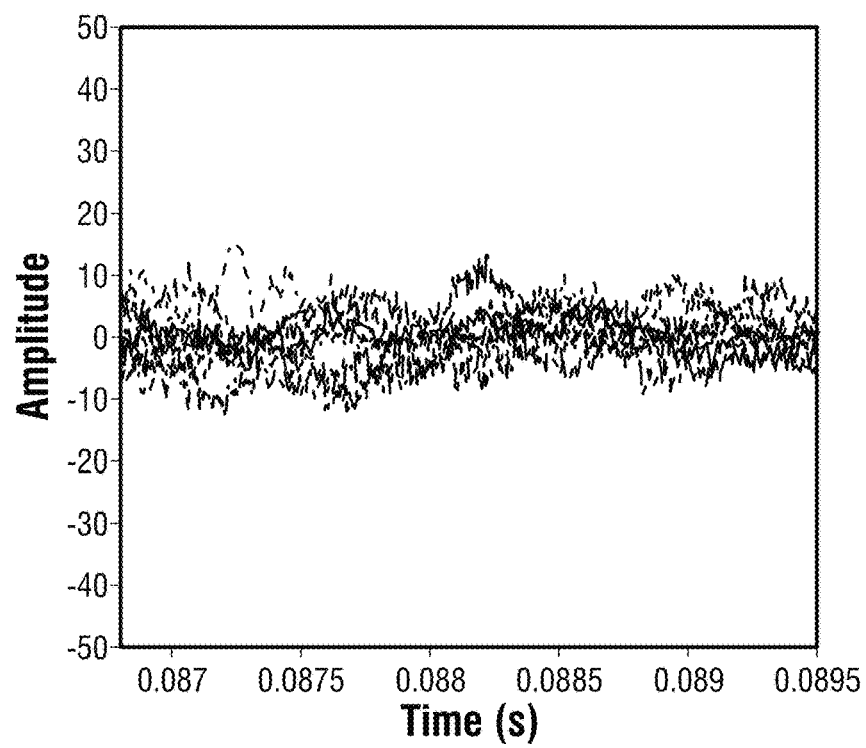
FIG. 4B is a graph of the raw signal after the remove of guided wave noise.
Figure 5A:
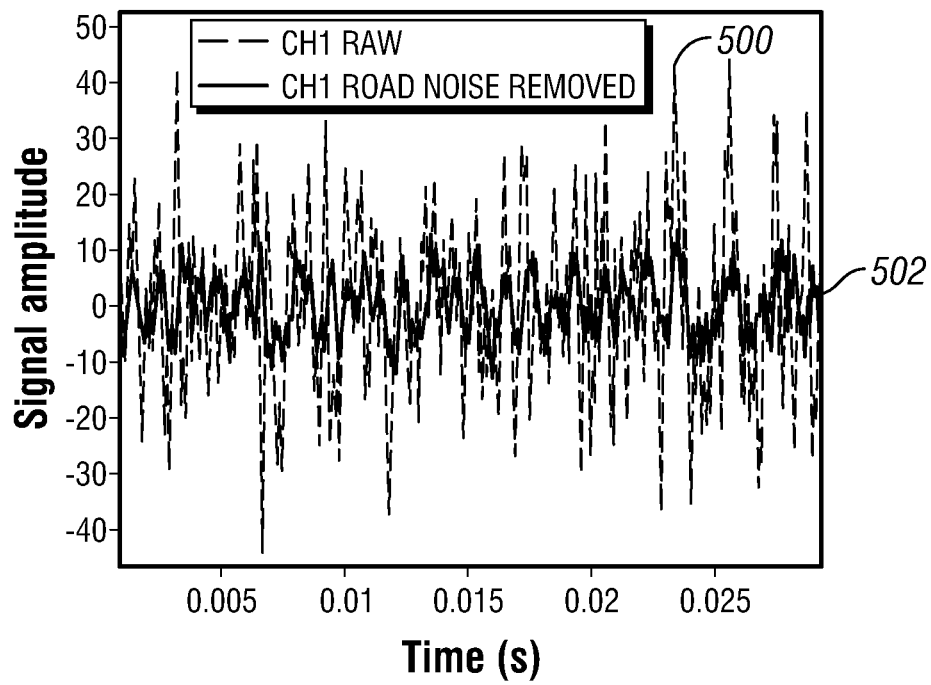
FIG. 5A is a graph of the removal of the guided wave noise in the time domain.
Figure 5B:
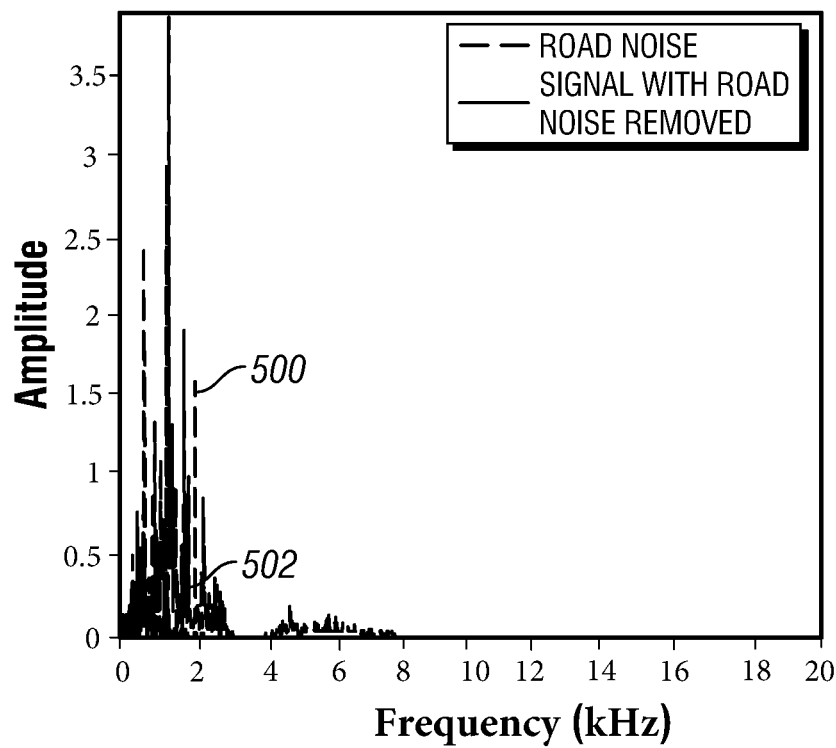
FIG. 5B is a graph of the removal of the guided wave noise in the frequency domain.

FIG. 4A is graph of simulated measured data of acoustic signals, including guided wave noise 308, which may be recorded by receivers 104 (e.g., referring to FIG. 1), in accordance with particular embodiments. Utilizing the methods described below, guided wave noise 308 and other noise may be removed with the resulting recorded acoustic signals shown in FIG. 4B in accordance with particular embodiments. FIG. 5A is a graph of simulated measured data in the time domain showing recorded acoustic signals by receivers 104 as raw data 500 with noise and clean data 502 after the removal of guided wave noise 308 in accordance with particular embodiments. FIG. 5B is a graph of simulated measured data in the frequency domain showing recorded acoustic signals by receivers 104 as raw data 500 with noise and clean data 502 after the removal of guided wave noise 308 in accordance with particular embodiments.

Figure 6:
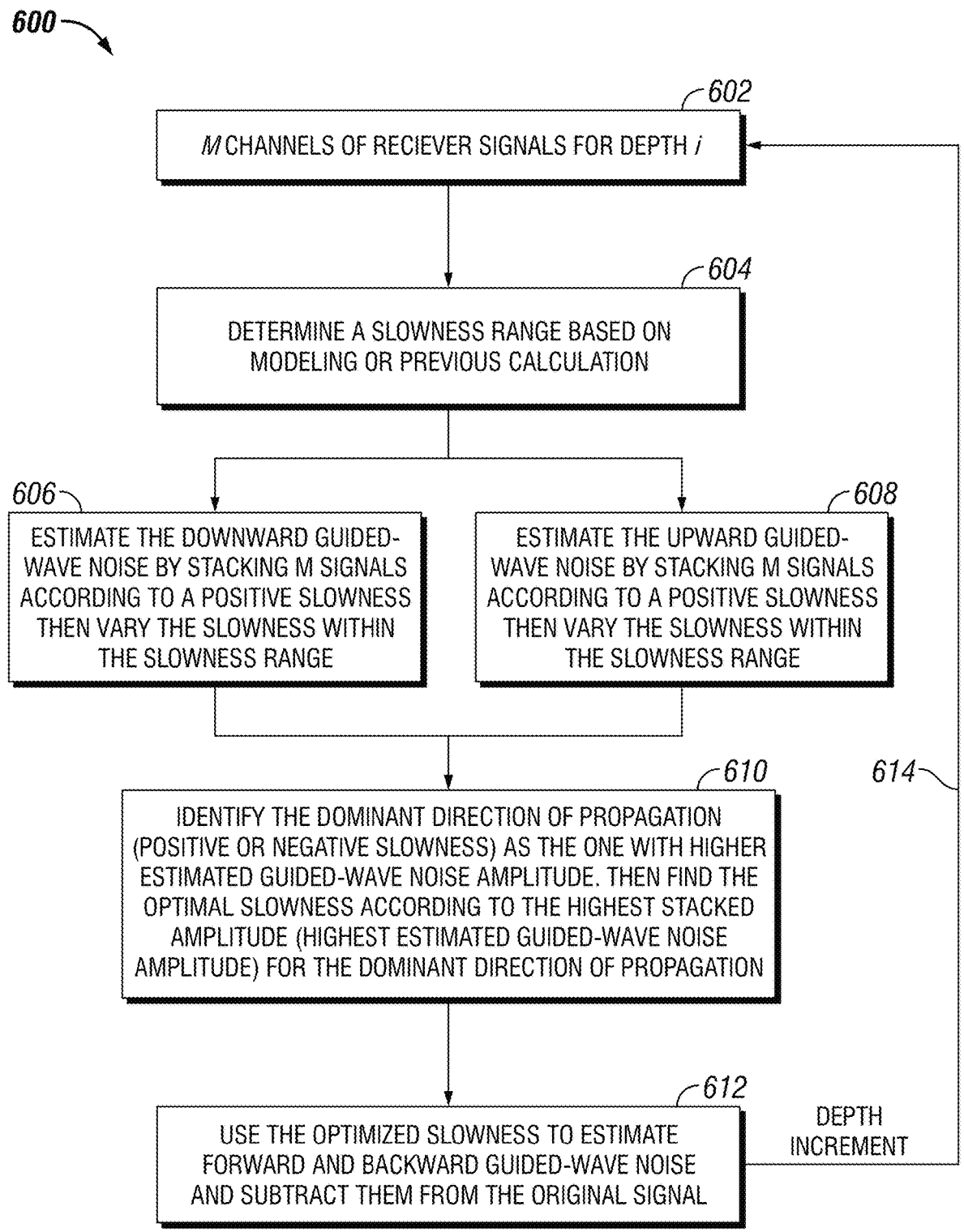
FIG. 6 is a workflow for removal of the guided wave noise in the time domain.

In examples, guided wave noise 308 may be removed utilizing a time-domain guided wave noise removal or a frequency-domain guided wave noise removal. FIG. 6 illustrates workflow 600 for a time-domain guided wave noise removal in accordance with particular embodiments. As illustrated, workflow 600 may begin with block 602 with M channels of receiver signals for depth i. Specifically, M channels indicates that any number of channels may be used during this method at an identified depth, i, of wellbore 110 (e.g., referring to FIG. 1). For examples there may be between a range between 1 and 100 channels that may be used at an identified depth. In block 602, the sensing and recording of acoustic signals is compiled into acoustic data for any number of channels, M, which is sent to information handling system 144 (e.g., referring to FIG. 1) for processing. The acoustic data from block 602 is processed on information handling system 144 in block 604. In block 604, a slowness range is determined based on modeling and/or previous calculations. Slowness is a reciprocal of the velocity of a wave through a medium, such as formation in which acoustic logging tool 100 may be disposed. Slowness may be measured in microseconds per foot. A slowness range is the range measurements may be found in microseconds per foot. In embodiments, the slowness range may be between 0 and 1000 microseconds per foot. In examples, a slowness range is determined from modeling using maximum and minimum slowness value from a physical simulation of how an acoustic signal propagates in the wellbore 110, which is constructed with a priori knowledge of dimension and propagation medium of wellbore 110. In examples, slowness ranges may be based on values determined from previous differences between an observed acoustic signal travel time divided by the physical separation between receivers 104. From block 604 the data may transfer to block 606 or block 608. In block 606, the downward guided-wave noise is estimated by stacking M signals propagated or back-propagated to the reference receiver according to a positive slowness. Then the slowness is varied within the slowness range to produce downward waves with a second slowness. In examples, the slowness is varied by delaying the M signals within the slowness range.

Figure 7:
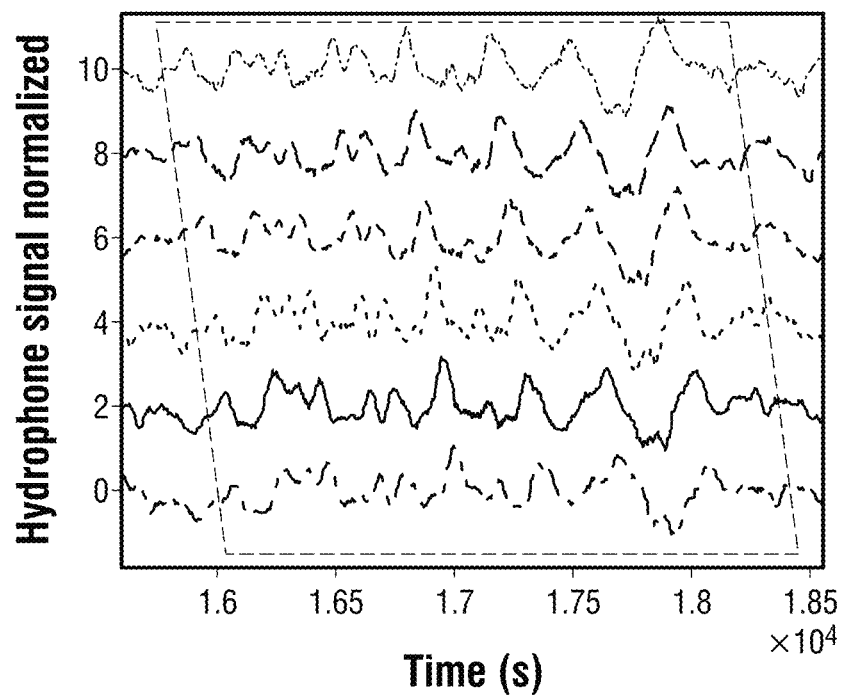
FIG. 7 illustrates stacking for a given slowness for guided wave noise estimation.
Figure 8:
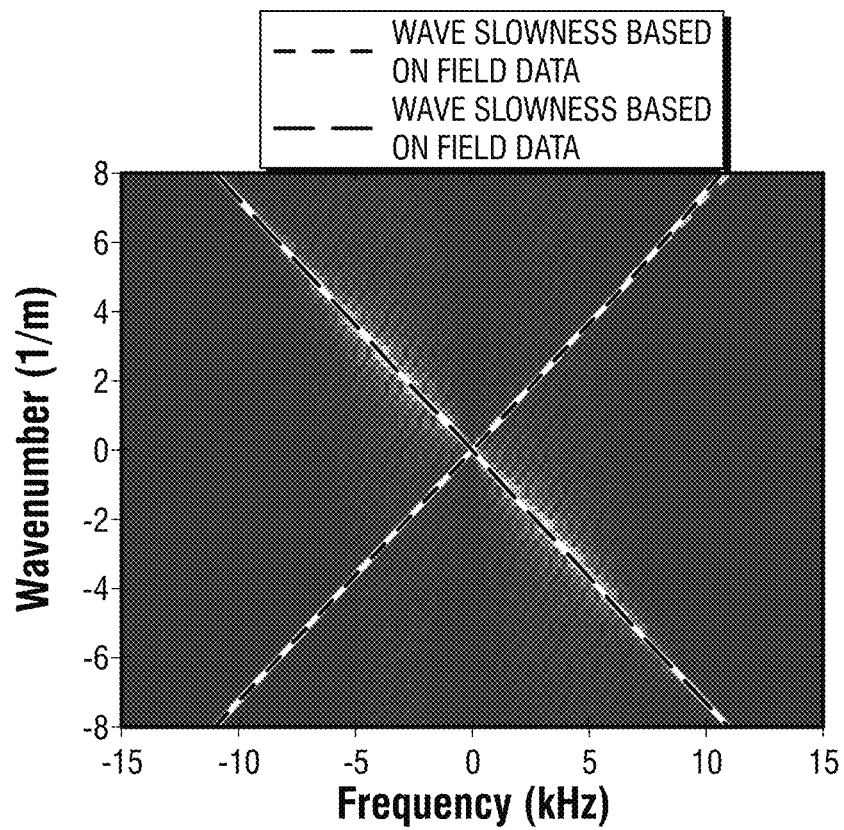
FIG. 8 is a graph of a Stoneley wave slowness plotted in the wavenumber-frequency domain.

To stack M signals, both the time-domain guided wave noise removal and the frequency-domain guided wave noise removal, discussed below, assume that leak signal 310 is not correlated in time with guided wave noise 308 (e.g., referring to FIG. 3.) Therefore, guided-wave noise 308 may be estimated by stacking M channels acoustic noise signals after propagated or back-propagated to the reference receiver according to an assumed guided-wave noise slowness in the defined slowness range, as discussed above. FIG. 7 is a graph of simulated data, where guided wave noise 308 is estimated by the mean of the amplitude of the stacked waveforms at all receivers 104 for time-domain guided wave noise removal in accordance with example embodiments. The time-domain guided wave noise removal assumes a constant propagation slowness without dispersion in the frequency of interest. This is generally valid at low frequency, which may be less than 20 kHz, and may be demonstrated using Stoneley wave dispersion curve obtained by solving the periodic wavenumber-frequency equation for the borehole model with one or more casing/tubing layers. For example, FIG. 8 is a graph that shows Stoneley wave slowness indicated by the slope of the Stoneley wave signal in a wavenumber-frequency plot remains a constant in a low frequency region. The guided wave noise 308 exists in a frequency below 5 kHz, as illustrated in the graph of FIG. 8 in accordance with example embodiments.

Referring back to FIG. 6, in block 608 the upward guided-wave noise is estimated by stacking M signals after propagated or back propagated to a reference receiver according to a negative slowness. Then, the slowness may be varied within the slowness range. The stacking of the upward guided-wave noise is performed as described above with the downward guided-wave noise. Data from blocks 606 and 608 is feed into block 610. In block 610 the method identifies the dominant direction of propagation (positive or negative slowness) as the one with higher estimated guided-wave noise amplitude. Then an optimized slowness (either in the upward direction or downward direction) is found according to the highest stacked amplitude, which is defined as the largest estimated guided wave noise amplitude, for the dominant direction of propagation. The optimized slowness is used in block 612. In block 612 the optimized slowness is used to estimate downward and upward guided-wave noise and subtracts them from an original recorded signal. This produces a clean signal, free of unwanted noise, for determining leak signal 310 (e.g., referring to FIG. 3). After a leak signal 310 is detected or not detected, acoustic logging tool 100 (e.g., referring to FIG. 1) may move a specified depth increment 614, in the upward or downward direction, and workflow 600 may be repeated. The depth increment may be any range determined by an operator, such as 10 feet (3 meters).

Figure 9:
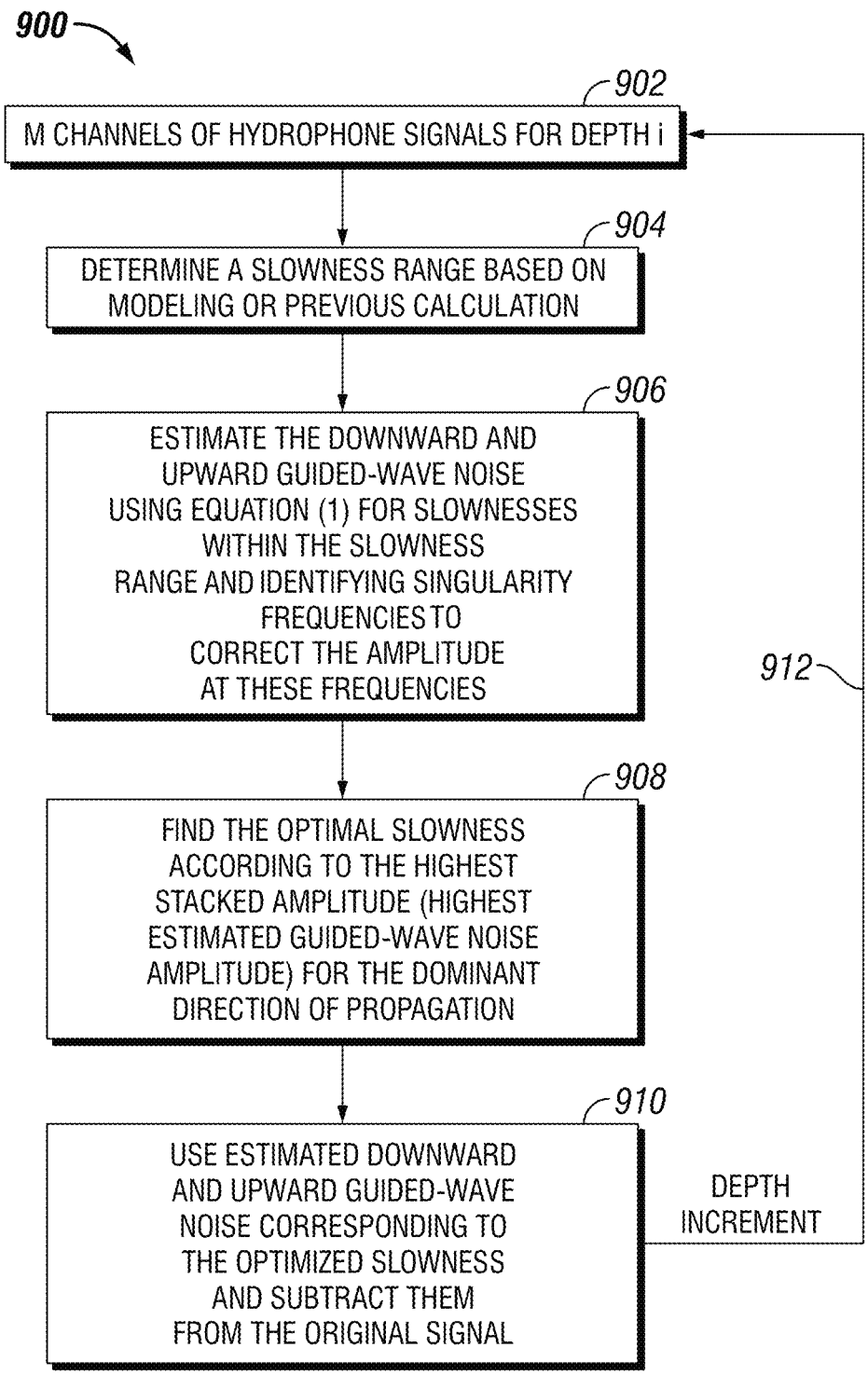
FIG. 9 is a workflow for removal of the guided wave noise in the frequency domain.

Alternatively, guided-wave noise 308 may be estimated in the frequency domain. For this method, time domain signals are transformed into a frequency domain, and the wave phase shifting, and stacking are done in the frequency domain before transforming the resulted guided-wave noise 308 into time domain. FIG. 9 illustrates workflow 900 for frequency domain guided-wave noise 308 removal in accordance with example embodiments. As illustrated, workflow 900 may begin with block 902 with M channels of receiver signal for depth i. Specifically, M channels indicates that any number of channels may be used during this method at an identified depth, i. In block 602, the sensing and recording of acoustic signals is compiled into acoustic data for any number of channels, M, which is sent to information handling system 144 (e.g., referring to FIG. 1) for processing. In block 902, the sensing and recording of acoustic signals as acoustic data with a number of channels, M, are compiled on information handling system 144 (e.g., referring to FIG. 1). The compiled data from block 902 is transferred to block 904. In block 904, a slowness range is determined based on modeling or previous calculations, as discussed above. From block 902 the acoustic data may transfer to block 906. In block 906, the downward and upward guided wave noise 308 are estimated using Equation (1), seen below, for slownesses within the slowness range. This step includes identifying singularity frequencies which may be used to correct the amplitude at these frequencies. Here, the singularity frequencies denote a certainty of frequencies that Equation (2), seen below, cannot be applied to, and the amplitude of guided-wave noise 308 cannot be computed. The frequencies identified as $f_s$ may be computed as:

$$f_s = 0.5 * \frac{v}{D_{RR}} \quad (1)$$

and multiples of $f_s$, where $D_{RR}$ is the spacing between adjacent receivers of 104 (e.g., referring to FIG. 3) and v is the propagation speed (reciprocal of slowness).

To achieve this a τ-p transform, wave separation method, may be used. For a given frequency ωn, the following equation may be used for the transformation:

$$\begin{bmatrix} e^{-iK_nZ_1} & e^{iK_nZ_1} \\ e^{-iK_nZ_2} & e^{iK_nZ_2} \\ \vdots & \vdots \\ e^{-iK_nZ_M} & e^{iK_nZ_M} \end{bmatrix} \begin{bmatrix} h_d(\omega_n) \\ h_u(\omega_n) \end{bmatrix} = \begin{bmatrix} S_1(\omega_n) \\ S_2(\omega_n) \\ \vdots \\ S_M(\omega_n) \end{bmatrix} \quad (2)$$

where $k_n = \frac{w_n}{v}$ is the wavenumber, v is the speed of propagation (reciprocal of slowness), $Z_1, Z_2, \ldots, Z_M$ are the location of M number of receivers 104 (e.g., referring to FIG. 1) along pipe string

138 propagation direction $S_M(\omega_n)$ is the frequency domain signal from receiver M at frequency $\omega_n$, $h_d(\omega_n)$ and $h_u(\omega_n)$ are the downward and upward wave in frequency domain. In examples, Equation (2) may be written in matric notation $$Ah = S \quad (3)$$

which has a solution of $$h = (\overline{A}A)^{-1}\overline{A}S \quad (4)$$

Referring back to FIG. 9, the data from block 906 is used in block 908 to find the optimal slowness according to the highest stacked amplitude, which is defined as the highest estimated guided wave noise amplitude, for the dominant direction of propagation. The optimized slowness is used in block 910. In block 910 the optimized slowness is used to estimate downward and upward guided wave noise and subtracts them form the original signal. This produces a clean signal for determining leak signal 310 (e.g., referring to FIG. 3). After a leak signal 310 is detected or not detected, acoustic logging tool 100 (e.g., referring to FIG. 1) may move a specified depth increment 912, in the upward or downward direction, and workflow 900 may be repeated. The depth increment may be any range determined by an operator, such as 10 feet (3 meters).

Figure 10:
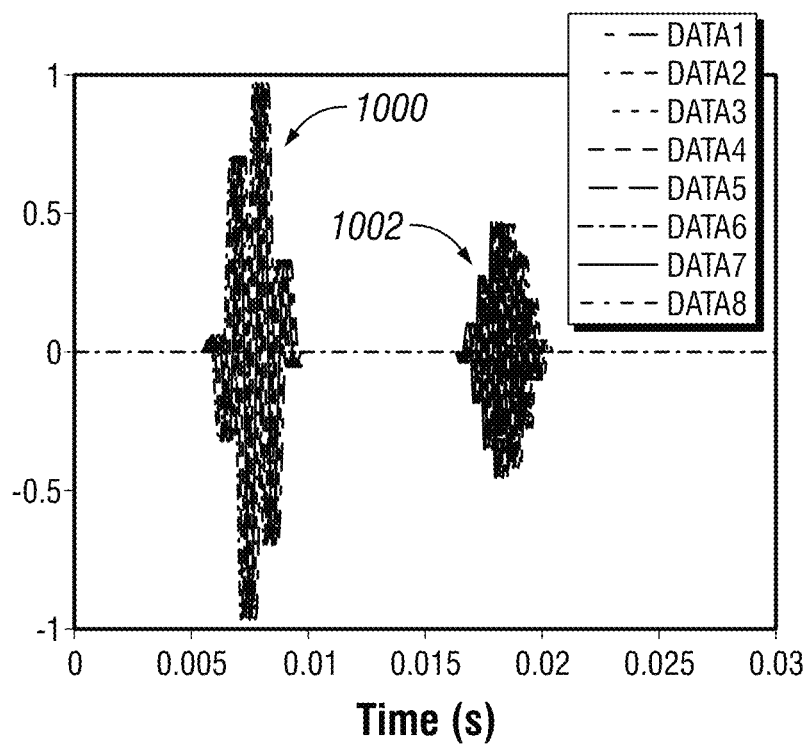
FIG. 10 is a graph showing upward propagating wave packets and forward propagating wave packets.
Figure 11:
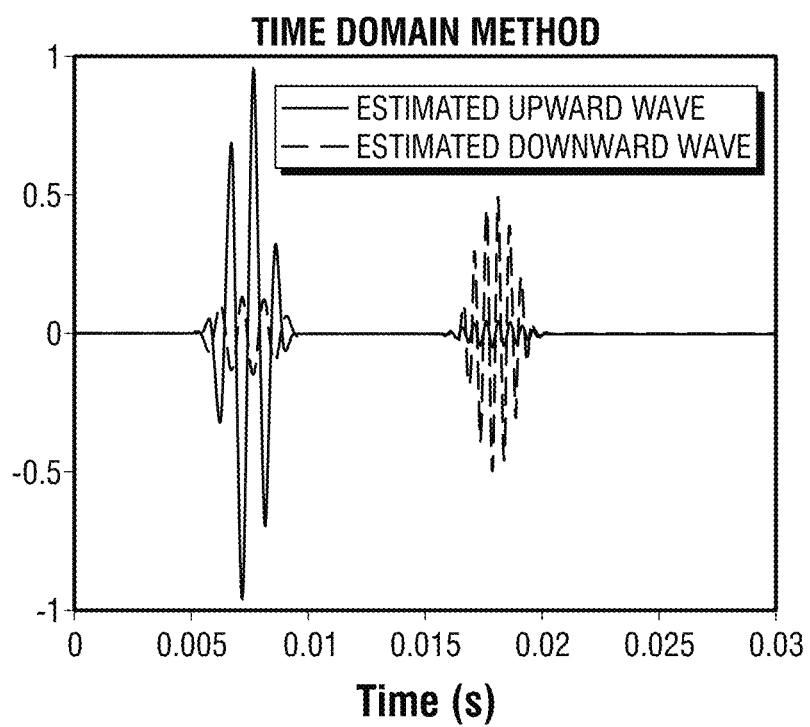
FIG. 11 is a graph of waveform estimation for removal of the guided wave noise in the time domain.
Figure 12:
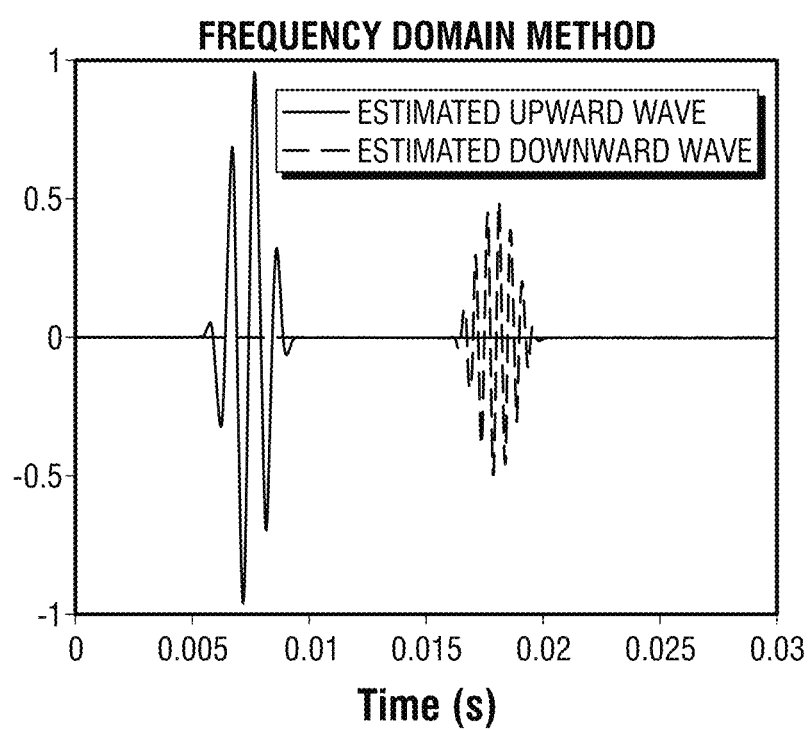
FIG. 12 is a graph of waveform estimation for removal of the guided wave noise in the frequency domain.
Figure 13:
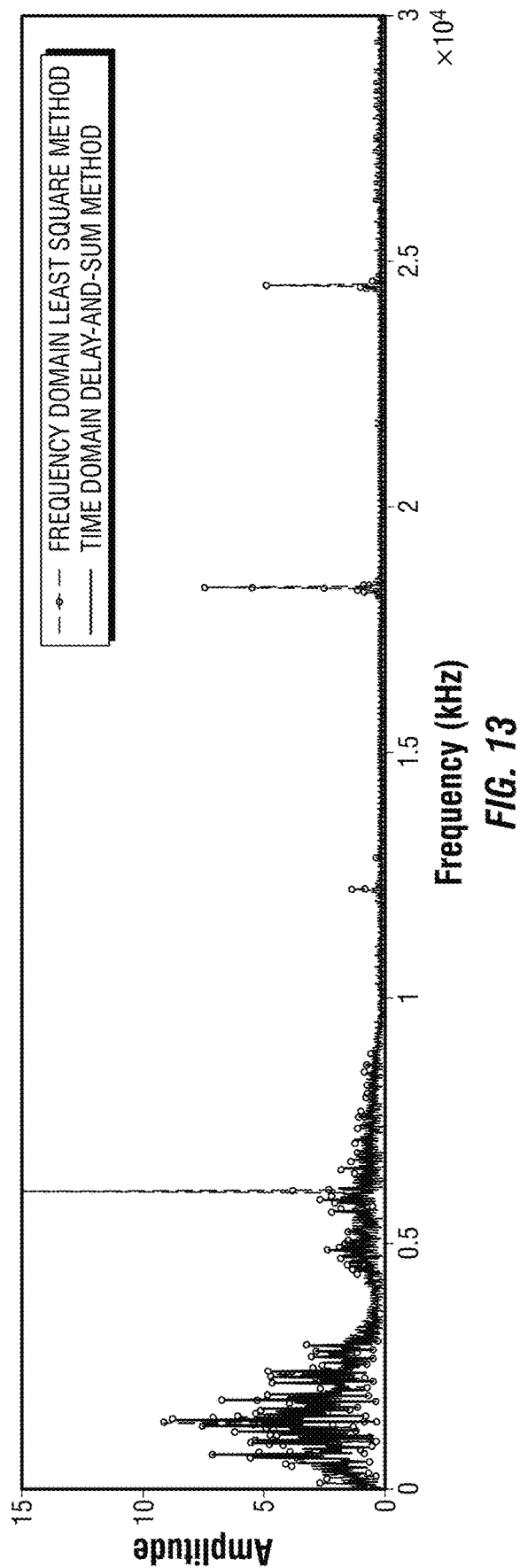
FIG. 13 is a graph of a frequency spectrum of waveform estimation for removal of the guided wave noise in the frequency domain.

The advantage of time-domain workflow 600 (e.g., referring to FIG. 6) is that it may have a fast computation time. The advantage of frequency-domain workflow 900 (e.g. referring to FIG. 9) is that the downward and upward waves are estimated simultaneously so that the amplitude of the wave in one direction does not affect the wave in the other direction. As illustrated in FIG. 10, synthetic data is used to show upward propagation wave packets 1000 and downward propagation wave packets 1002. FIG. 11 illustrates the results of workflow 600 on simulated upward propagation wave packets 1000 and simulated downward propagation wave packets 1002 in accordance with example embodiments. FIG. 12 illustrates the results of workflow 900 on simulated upward propagation wave packets 1000 and simulated downward propagation wave packets 1002 in accordance with example embodiments. FIGS. 11 and 12 illustrate the difference in wave estimation between utilizing workflow 600 and workflow 900.

Without limitation, additional p transformations, wave separation method, may include methods to reduce aliasing effects to prevent the contribution of inconsistent amplitude to at the aliasing frequencies and assume that each wave package has a reasonably consistent amplitude along its true slowness slope. Some examples are using p semblance, amplitude ratio testing filter, and local slope calculation.

FIG. 14A illustrates a beamforming map with raw signals recorded by receivers 104 (e.g., referring to FIG. 3) during measurement operations in accordance with example embodiments. The effect of guided-wave noise removal on beamforming result from field data is shown in FIG. 14A. The high amplitude upgoing guided-wave noise creates a false noise source 1400 at the bottom of the beamforming map. This effect on beamforming map is observed at depths that may include a minimum or low leak signal 310 (e.g., referring to FIG. 3). After removal of guided wave noise 308 with workflow 600 and workflow 800 (e.g. referring to FIGS. 6 and 9, respectively), false noise source 1400 is removed and the overall amplitude is lower and more uniform. FIG. 14B illustrates the beamforming map after using workflow 600 (e.g., referring to FIG. 6) and FIG. 14C illustrates the beamforming map after using workflow 900 (e.g., referring to FIG. 9) in accordance with example embodiments.

Figure 15A:
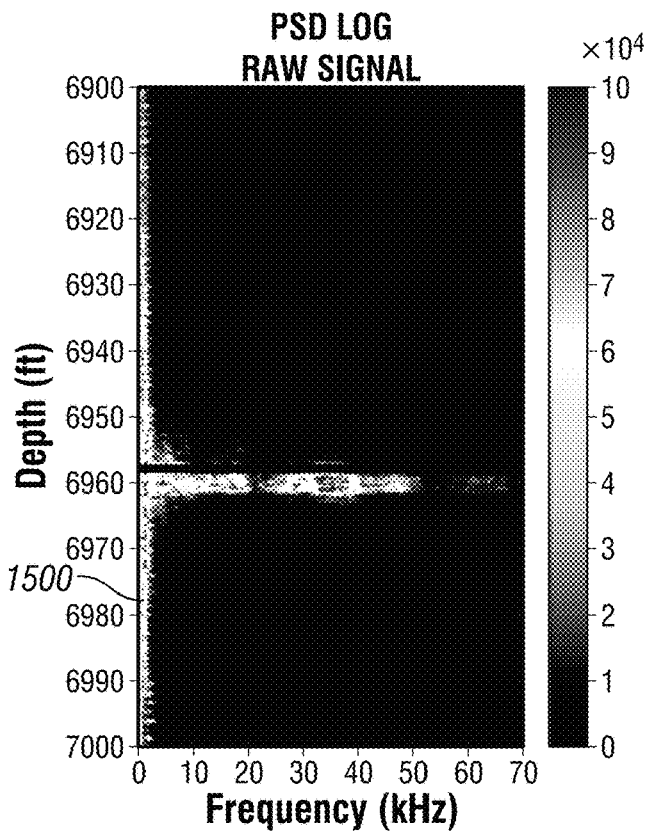
FIG. 15A is a power spectrum density log of a raw signal recorded by the receiver array.
Figure 15B:
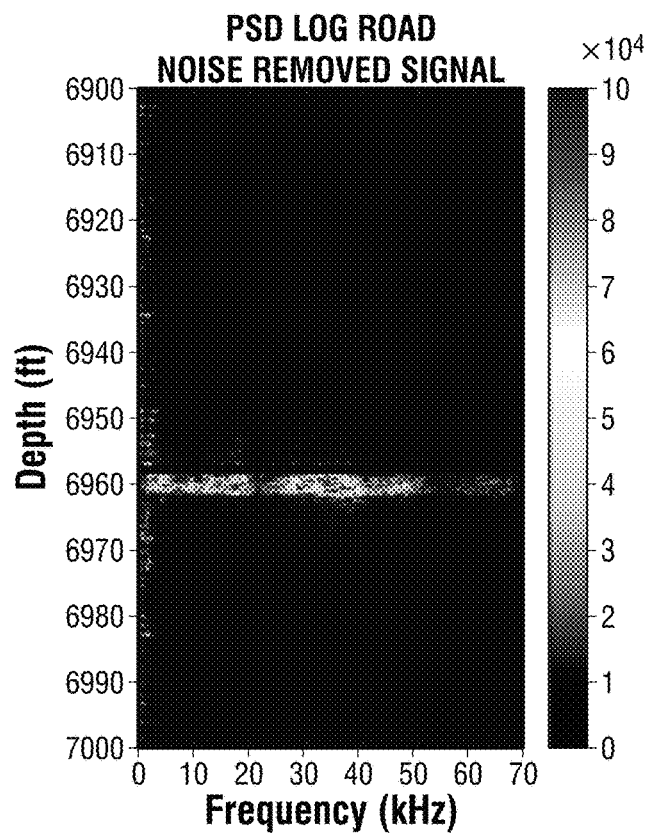
FIG. 15B is the power spectrum density log after guided wave noise removal from the raw signal.

FIG. 15A is a power spectrum density log with raw signals recorded by receivers 104 (e.g., referring to FIG. 3) during measurement operations in accordance with example embodiments. FIG. 15B shows a power spectrum density log based after guided-wave noise 308 have been removed in accordance with example embodiments. High energy 1500 below 5 kHz due to Stoneley noise is removed for the latter case. The accuracy of guided-wave noise estimation relies on the accuracy of optimized guided-wave noise slowness. However, the guided-wave noise slowness may not be accurate at times due to signal quality or high leak signal 310 (e.g., referring to FIG. 3). One method to improve the accuracy is by stacking of several acquisitions, assuming that guided-wave noise slowness does not vary significantly within a short depth interval. Another method is to identify outliers in the guided-wave noise slowness log to remove the sudden jump of guided-wave noise slowness.

Without limitation, workflow 600 (e.g., referring to FIG. 6) and workflow 900 (e.g., referring to FIG. 9) may be performed independently or in combination with each other. For example, the slowness may be optimized from a slowness range using workflow 600. Workflow 900 may be used to estimate guided-wave noise 308 (e.g., referring to FIG. 3) with the optimized slowness. This may be due to workflow 600 being faster in computation and workflow 900 is more accurate in wave separation of two directions.

Improvements over current prior art is found in the process of estimating guided-wave noise and removing the guided-wave noise from raw signals that are captured in a continuous logging operation. This may be performed by two methods that either are time domain based or frequency domain based. During operations, time domain or frequency domain may be used separately or in combination with each other to remove guided-wave noise. Specifically, the improvement to operation is found by identifying the physics of the guided-wave noise (road noise, or leakage-induced noise), the propagation direction, frequency range, and dispersion characteristics. Then utilizing time domain delay and stack method to estimate slowness and noise. Additionally, the frequency domain wave separation method may be used to estimate slowness and noise. The operation and method may further stack multiple acquisitions or smoothing the slowness log to further enhance the slowness or guided-wave noise estimation and remove guided-wave noise from raw waveforms. This method of operations may provide a clearer spatial power spectrum plot for our client and reduces the false positive localization of guided-wave noise. The systems and methods may include any of the various features disclosed herein, including one or more of the following statements.

Statement 1: A method for removing a guided wave noise in a time-domain may comprise recording one or more acoustic signals with one or more receivers at a first location, wherein the one or more acoustic signals are raw data. The method may further comprise determining a slowness range, estimating a downward guided wave noise by stacking the one or more acoustic signals based at least in part on a positive slowness, estimating an upward guided wave noise by stacking the one or more acoustic signals based at least in part on a negative slowness, identifying a dominant direction of propagation, and identifying a slowness from a highest stacked amplitude for the dominant direction of propagation. The method may further comprise estimating a downward guided wave noise with the slowness, estimating an upward guided wave noise with the slowness, and subtracting the downward guided wave noise and the upward guided wave noise from the raw data.

Statement 2. The method of statement 1, further comprising varying the slowness in the slowness range.

Statement 3. The method of statements 1 or 2, wherein the slowness range is found based at least in part on modeling.

Statement 4. The method of statements 1-3, wherein the slowness range is found based at least in part on one or more prior calculations.

Statement 5. The method of statements 1-4, wherein the highest stacked amplitude is an estimated amplitude of the guided wave noise.

Statement 6. The method of statements 1-5, further comprising recording a second set of acoustic signals with the one or more receivers at a second location.

Statement 7. The method of statements 1-6, further comprising identifying a leak signal from the raw data.

Statement 8. A method for removing a guided wave noise in a frequency-domain may comprise recording one or more acoustic signals with one or more receivers at a first location, wherein the one or more acoustic signals are raw data. The method may further comprise determining a slowness range, estimating a downward guided wave noise and an upward guided wave noise, identifying a slowness that is a highest stacked amplitude, estimating the downward guided wave noise with the slowness, estimating an upward guided wave noise with the slowness, and subtracting the downward guided wave noise and the upward guided wave noise from the raw data.

Statement 9. The method of statement 8, further comprising identifying one or more singularity frequencies.

Statement 10. The method of statement 9, further comprising correcting one or more amplitudes of the one or more singularity frequencies.

Statement 11. The method of statements 8 or 9, wherein the highest stacked amplitude is an estimated amplitude of the guided wave noise.

Statement 12. The method of statements 8, 9, or 11, further comprising recording a second set of acoustic signals with the one or more receivers at a second location.

Statement 13. The method of statements 8 9, 11, or 12, further comprising creating a beamforming map that includes a fake noise source.

Statement 14. The method of statements 8, 9, or 11-13, further comprising removing a fake noise source from a beamforming map.

Statement 15. The method of statements 8, 9, or 11-14, further comprising identifying a leak signal from the raw data.

Statement 16. A method for identifying a leak may comprise recording one or more acoustic signals as raw data with one or more receivers disposed on a receiver array, performing a guided wave reduction processes on the raw data, performing a beamforming processing on the raw data, identifying a position or the leak, and identifying an intensity of the leak.

Statement 17. The method of statement 16, wherein the guided wave reduction process may comprise transferring the raw data into a time-domain, determining a slowness range, and estimating a downward guided wave noise by stacking the one or more acoustic signals based at least in part on a positive slowness. The method may further comprise estimating an upward guided wave noise by stacking the one or more acoustic signals based at least in part on a negative slowness, identifying a dominant direction of propagation, identifying a slowness from a highest stacked amplitude for the dominant direction of propagation, estimating a downward guided wave noise with the slowness, estimating an upward guided wave noise with the slowness, and subtracting the downward guided wave noise and the upward guided wave noise from the raw data.

Statement 18 The method of statement 16, wherein the guided wave reduction process may comprise transferring the raw data into a frequency-domain, determining a slowness range, estimating a downward guided wave noise and an upward guided wave noise, identifying a slowness from a highest stacked amplitude for a dominant direction of propagation, estimating a downward guided wave noise with the slowness, estimating an upward guided wave noise with the slowness, and subtracting the downward guided wave noise and the upward guided wave noise from the raw data.

Statement 19. The method of statement 18, further comprising identify one or more singularity frequencies.

Statement 20. The method of statement 19, further comprising correcting the one or more amplitudes of the one or more singularity frequencies.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for removing a guided wave noise in a time-domain, comprising:
    recording one or more acoustic signals with one or more receivers on an acoustic logging tool at a first location, wherein the one or more acoustic signals are raw data;
    determining a slowness range;
    estimating a downward guided wave noise by stacking the one or more acoustic signals based at least in part on a positive slowness;
    estimating an upward guided wave noise by stacking the one or more acoustic signals based at least in part on a negative slowness;
    identifying a dominant direction of propagation;
    identifying a slowness from a highest stacked amplitude for the dominant direction of propagation;
    estimating a downward guided wave noise with the slowness;
    estimating an upward guided wave noise with the slowness;
    subtracting the downward guided wave noise and the upward guided wave noise from the raw data; and
    moving the acoustic logging tool to a second location, wherein the second location is determined by the one or more acoustic signals.

2. The method of claim 1, further comprising varying the slowness in the slowness range.

3. The method of claim 1, wherein the slowness range is found based at least in part on modeling.

4. The method of claim 1, wherein the slowness range is found based at least in part on one or more prior calculations.

5. The method of claim 1, wherein the highest stacked amplitude is an estimated amplitude of the guided wave noise.

6. The method of claim 1, further comprising recording a second set of acoustic signals with the one or more receivers at a second location.

7. The method of claim 1, further comprising identifying a leak signal from the raw data.

8. A method for removing a guided wave noise in a frequency-domain, comprising:
    recording one or more acoustic signals with one or more receivers disposed on an acoustic logging tool at a first location, wherein the one or more acoustic signals are raw data;
    determining a slowness range;
    estimating a downward guided wave noise and an upward guided wave noise;
    identifying a slowness that is a highest stacked amplitude;
    estimating the downward guided wave noise with the slowness;
    estimating an upward guided wave noise with the slowness;
    subtracting the downward guided wave noise and the upward guided wave noise from the raw data
    moving the acoustic logging tool to a second location, wherein the second location is determined by the one or more acoustic signals.

9. The method of claim 8, further comprising identifying one or more singularity frequencies.

10. The method of claim 9, further comprising correcting one or more amplitudes of the one or more singularity frequencies.

11. The method of claim 8, wherein the highest stacked amplitude is an estimated amplitude of the guided wave noise.

12. The method of claim 8, further comprising recording a second set of acoustic signals with the one or more receivers at a second location.

13. The method of claim 8, further comprising creating a beamforming map that includes a fake noise source.

14. The method of claim 8, further comprising removing a fake noise source from a beamforming map.

15. The method of claim 8, further comprising identifying a leak signal from the raw data.

16. A method for identifying a leak comprising:
recording one or more acoustic signals as raw data with one or more receivers disposed on a receiver array, wherein the receiver array is disposed on an acoustic logging tool;
performing a guided wave reduction processes on the raw data;
performing a beamforming processing on the raw data;
identifying a position or the leak;
identifying an intensity of the leak
moving the acoustic logging tool to a second location, wherein the second location is determined by the one or more acoustic signals.

17. The method of claim 16, wherein the guided wave reduction process comprises:
transferring the raw data into a time-domain;
determining a slowness range;
estimating a downward guided wave noise by stacking the one or more acoustic signals based at least in part on a positive slowness;
estimating an upward guided wave noise by stacking the one or more acoustic signals based at least in part on a negative slowness;
identifying a dominant direction of propagation;
identifying a slowness from a highest stacked amplitude for the dominant direction of propagation;
estimating a downward guided wave noise with the slowness;
estimating an upward guided wave noise with the slowness; and
subtracting the downward guided wave noise and the upward guided wave noise from the raw data.

18. The method of claim 16, wherein the guided wave reduction process comprises:
transferring the raw data into a frequency-domain;
determining a slowness range;
estimating a downward guided wave noise and an upward guided wave noise;
identifying a slowness from a highest stacked amplitude for a dominant direction of propagation;
estimating a downward guided wave noise with the slowness;
estimating an upward guided wave noise with the slowness; and
subtracting the downward guided wave noise and the upward guided wave noise from the raw data.

19. The method of claim 18, further comprising identify one or more singularity frequencies.

20. The method of claim 19, further comprising correcting the one or more amplitudes of the one or more singularity frequencies.

* * * * *